C. H. MARTIN.
TRACTOR.
APPLICATION FILED DEC. 17, 1914.
1,223,505.
Patented Apr. 24, 1917.
3 SHEETS—SHEET 3.
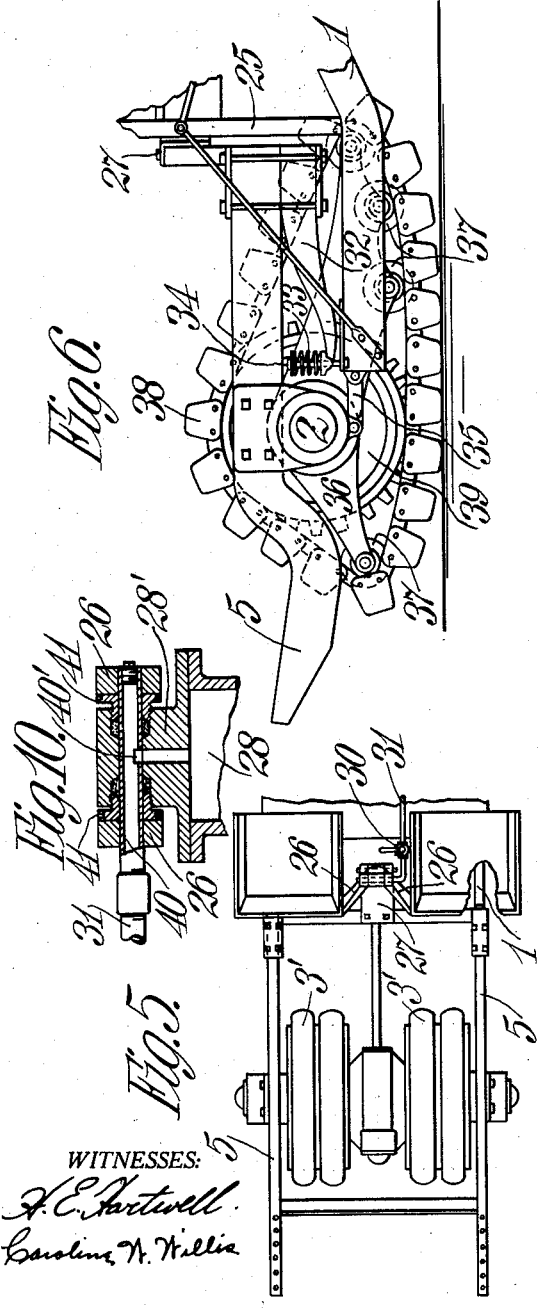
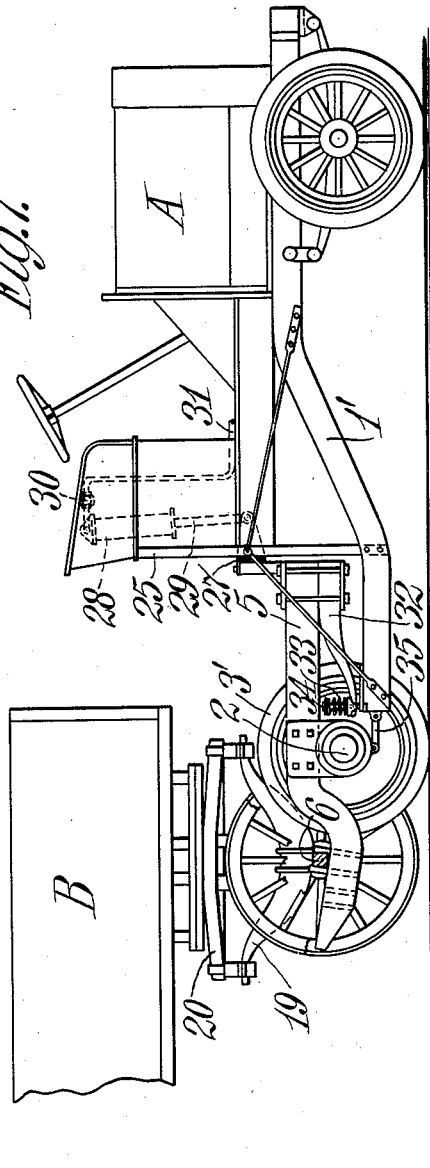
WITNESSES:
A. E. Hartwell
Caroline N. Willis
INVENTOR.
Charles H. Martin.
BY
Chapin & Co.
ATTORNEY.

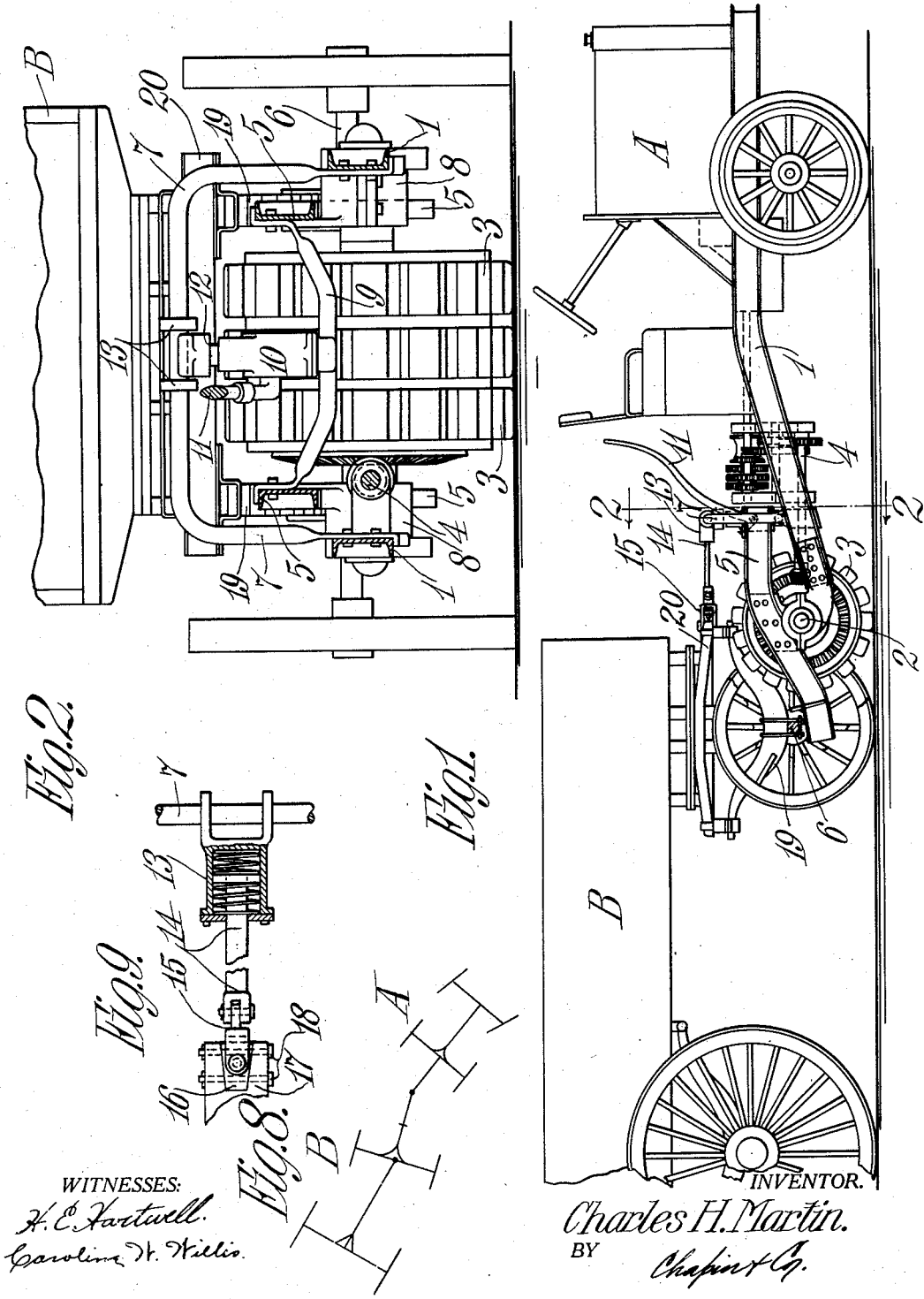

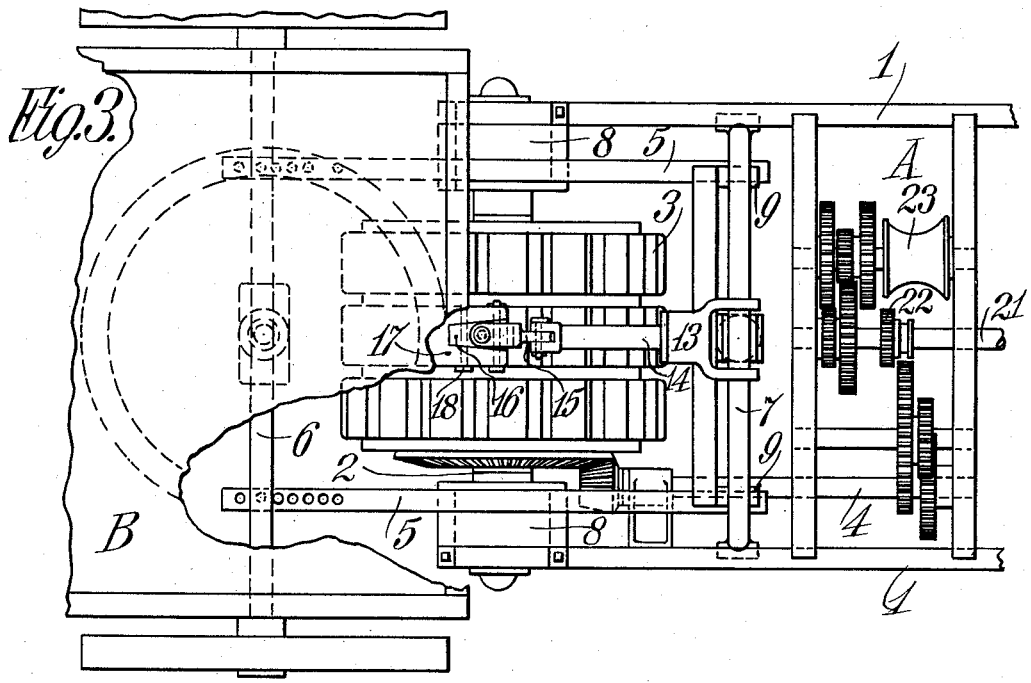
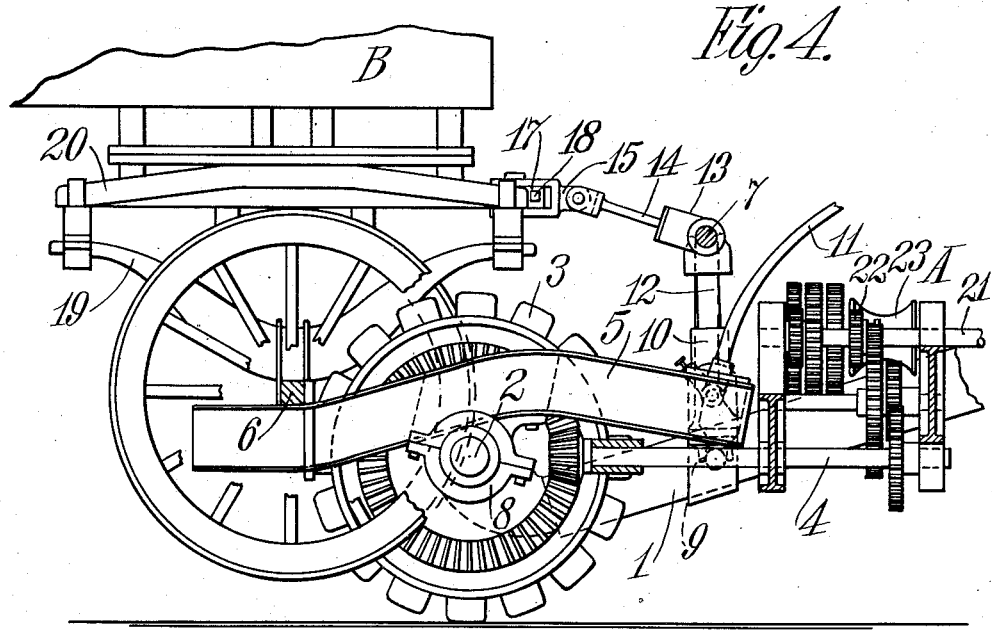

UNITED STATES PATENT OFFICE.

CHARLES H. MARTIN, OF SPRINGFIELD, MASSACHUSETTS.

TRACTOR.

1,223,505. Specification of Letters Patent. Patented Apr. 24, 1917.

Application filed December 17, 1914. Serial No. 877,698.

*To all whom it may concern:*

Be it known that I, CHARLES H. MARTIN, a citizen of the United States, residing in the city of Springfield, county of Hampden, and State of Massachusetts, have invented certain new and useful Improvements in Tractors, of which the following is a specification.

This invention relates to an improved tractor for road or field service in hauling, turning, and backing with a trailer. Tractors for this general purpose have heretofore been used.

The object of this invention is to improve the tractor for this purpose and make it of more general application as a mechanical substitute for a horse. Other objects will appear in the detailed description and annexed claims.

The analogy between the operations and adaptability of the horse in handling wagons or trailers and the improved tractor will be developed and pointed out in the description of the operation.

The preferred embodiment of my invention chosen for the purposes of illustration is shown in the accompanying drawings, in which—

Figure 1 is a side elevation with parts broken away of the tractor and trailer in position to operate together;

Fig. 2 is a sectional view taken on line 2—2 of Fig. 1;

Fig. 3 is a plan view with parts broken away of the rear end of the tractor and front end of the trailer in assembled position;

Fig. 4 is a side elevation with parts shown in section and parts broken away of the rear end of the tractor and front end of the trailer;

Fig. 5 is a plan view of parts of the tractor showing the mounting arrangement of a power jack;

Fig. 6 is a side elevation of the rear end of a tractor having a caterpillar tread;

Fig. 7 is a view similar to Fig. 1 showing a modified form of tractor and trailer connecting mechanism;

Fig. 8 is a diagrammatic view of the tractor-trailer combination indicating the necessity of avoiding two pivotal points in the connection of the tractor and trailer if the latter is to be backed; and Fig. 9 is a detail view of the draw-bar connection;

Fig. 10 is a sectional view of a portion of the jack shown in Fig. 7 and illustrates the manner in which air is supplied to the cylinder thereof.

Referring to the drawings and particularly to Figs. 1 to 4, inclusive, A represents the tractor unit and B the trailer unit of the combination. The frame of the tractor is indicated by the numeral 1 and comprises spaced channel shaped members which are suitably journaled upon the rear axle 2 of the tractor. Mounted on the axle 2 and between the frames 1 is the rear wheel 3, shown as a multiple wheel of the sectional block-tread type, but which may be of any other suitable form. The rear wheel 3 is driven by the bevel-gearing shown from a shaft 4 suitably mounted in brackets attached to the frame 1. 21 represents a jack-shaft rearwardly extending from the transmission of the tractor and, slidable thereon, by any suitable means (not shown), is a pinion 22, which is arranged to drive either of the gear trains shown in Fig. 3. The shaft 4 is driven by one of these trains, and the other gear train drives a winch 23, as indicated in the drawing. The jack-shaft 21, winch 23, and both gear trains are suitably mounted in frames secured to and extending transversely across the main frames 1.

Pivotally mounted on the rear axle 2, by means of the bearings 8 (see Figs. 2 and 4), is a movable frame 5. The latter, as clearly shown in Fig. 3, comprises a pair of spaced channel shaped members, which extend forwardly and rearwardly from the rear axle. The rearward extensions of this frame 5 are adapted to underlie the front axle 6 of the trailer unit B, as clearly shown in Figs. 1 and 4. Secured to and bridging across the forward portions of the frame 5 is a bar 9 (see Fig. 2). Above the latter is another bar 7 similarly arranged and secured to the frames 1 of the tractor. This bar 7 is bent in the form of an inverted U, the horizontal portion of which is spaced from the bar 9. Interposed between these bars 7 and 9 is a jack or lifting mechanism 10 which has a plunger 12. The jack here shown is of a well-known commercial form fitted with means to engage the bar 9. The plunger 12 is also provided with means to engage the bar 7, and the jack is operable by a handle 11. When the jack is operated, the bars 7 and 9 are separated in an obvious manner, and the rearward extensions of the frames 5 are elevated as shown in Fig. 4. These frames 5 have formed in their rearward portions a plurality of holes, best seen in Fig. 3, which are arranged to receive the pins shown in Figs. 1 and 4 to engage the axle 6 of the trailer.

Supported from the axle 6 by means of the semi-elliptical springs 19 is the usual platform 20, which supports the fifth-wheel structure. The structure of the trailer B is not specifically described as it is of a common well-known form. That is to say, the trailer unit is permissibly of the ordinary horse-drawn type of truck and the tractor is adapted to coöperate with the ordinary truck heretofore drawn by horses. These trucks have, as a rule, a centrally arranged member 17 (see Fig. 3), which is secured to and extends forwardly from the platform 20. This member is provided ordinarily for the purpose of receiving the wagon-pole, by means of which the vehicle is drawn by horses. It is also made use of in my invention as a means to attach the draft-rigging or draw-bar, and the preferred detail of the latter is clearly shown in Fig. 9. The trailer B is provided with the usual fifth wheel structure for steering and for the purposes of this description all those parts movable with the lower fifth wheel member may be considered the steering mechanism of the trailer. Thus any part which can be operably engaged to steer the trailer may properly be called a part of the steering mechanism.

Loosely mounted on the bar 7 and spanning the head of the plunger 12 of the jack 10, is a casing 13 and movable therein against the coiled springs shown is a plunger, which is fixed to a draw-bar 14. Fixed to the member 17 by the removable pins 18 is a tongue 16 and the latter is connected to the bar 14, by the link 15 as clearly shown in the figure. The two pivotal connections between the bar 14 and tongue 16 are arranged at right angles one to the other so that vertical and horizontal movements in the draft rigging are permitted.

Figs. 5 and 7 show a modified form of tractor in which the draft rigging heretofore described is omitted and the rear wheels 3′ are driven by the centrally disposed transmission shown. A second pair of pins in the movable frames 5 are arranged behind the axle 6 and serve as the draft connection, as clearly shown in Fig. 7. The frames 5 are in this modification operated by a jack arranged between the dual seats of the tractor as shown in Fig. 5. The frames 1′ of the tractor A bear thereon upwardly extending members 25 and secured thereto are suitable brackets 26 between and on which the jack cylinder 28 is pivotally mounted (see Fig. 10). The plunger 29 of the jack is pivotally connected to a bracket 27 fixed to the movable frames 5. This jack is arranged for operation by compressed air, which is carried to the cylinder 28 by a pipe 31. A suitable two way valve interposed in this pipe is indicated at 30 and controls the admission and exhaustion of air from the cylinder 28 in a well-known manner. The manner in which air is introduced into the jack cylinder is clearly shown in Fig. 10. The cylinder 28 has a head 28′ formed with an upwardly extending ear and passing therethrough and through the brackets 26 is a hollow steel spindle 40. The latter is plugged at one end as shown and is connected at the other end to the pipe 31. This member 40 has a port 40′ formed therein which is always in registration with a centrally and vertically arranged passage through the head 28′ leading to the interior of the cylinder. Suitable stuffing boxes 41 on either side of the head 28′ prevent leakage of air from the movable cylinder 28 around the spindle 40. The pipe 31 may be connected to a suitable reservoir supplied from a compressor which is controlled by a pressure operated governor. These elements are well known and the principle of operation of such apparatus is well understood. Accordingly this apparatus has not been illustrated since any of the commercial forms of compressed air apparatus might be used to supply the cylinder 28. The frames 5 are movable by this jack in an obvious manner analogous to that already described.

The frame 1′ of the tractor shown in Fig. 7 is not directly connected to the axle 2 as in the form of trailer shown in Fig. 1. This connection is modified to permit a yieldable support for the tractor body. Secured to the forwardly extending portions of the frames 5 are leaf springs 32, which extend downwardly and rearwardly in cantaliver fashion toward the end of the frames 1′. Resting upon the free ends of these springs are seats, which bear thereon coil springs 33. The upper ends of these coil springs are tied to the frames 1′ by bolts 34. Thus the frames 1′ are yieldably supported from the frames 5. Tie bars 35 are arranged to connect the rear ends of the frames 1′ with the bearings, upon which the frames 5 are mounted.

The tractive member of the tractor A need not be the ordinary wheel but may be of any desired form. For example, this tractive member may be of the caterpillar type and such a structure is illustrated in Fig. 6. The construction of the tractor as shown in this figure is identical with that described in connection with Figs. 5 and 7, except that the rear wheels 3' are replaced by a sprocket or sprockets 39. Pivotally mounted on the axle 2 is a member 36 having arms extending rearwardly and forwardly from the axle. On these arms are mounted rolls 37, which may be of any suitable or desired number. These rolls 37 and the sprocket 39 support a chain 38, which carries a plurality of traction blocks and is propelled by the sprocket. This type of tractive member is especially suitable for soft soils, such as plowed fields and the like, since it has at all times a number of traction blocks in contact with the ground. It is also to be noted that the pivotal mounting of the arm 36 permits the caterpillar chain 38 to "walk" over an obstruction. Thus if a stone is in the path of the chain 38 the forward rolls will be raised thereby and the tractor will pass over the stone without difficulty.

In operation the tractor may be backed under the forward end of a trailer (an ordinary truck or specially built trailer) and connected thereto through the draw bar. This is like harnessing horses to the truck. If the load is very heavy, or other conditions make it hard to start the load, the elevating mechanism is operated to lift the front end of the trailer and throw its weight on the power driven wheels to increase the traction. The traction can be thus increased either at the start or while under way. This is like a horse digging his hoofs into the ground and shifting his weight largely to his rear legs by crouching when the going is hard. When the going is easy the trailer may be lowered to rest on its own front supports and the tractor then goes along easily and steers the trailer. Thus unnecessary strains on the tractor (the expensive part of the equipment) are eliminated and the tractor saves itself and adapts itself (with the direction of the driver) like a horse, to the conditions under which it works.

The arrangement of the traction wheels, with its axle close to the vertical axis of the trailer's steering mechanism and in overlapping relation to the trailer's front wheels, is preferred for steering purposes. With this arrangement the draw bar has its vertical pivot preferably above the rear axle of the tractor. The latter can thus haul and steer the trailer so that its steering wheels will approximately follow the rear wheels of the tractor. When the tractor backs, however, the pivot in the draw bar acting with the fifth wheel would tend to misdirect the trailer. This can be seen by considering the pivotal connections in the combination A—B in Fig. 8. Therefore, the elevating mechanism is used to operably engage the steering parts of the trailer to properly direct the latter through its fifth wheel connection alone. In this operation of backing the draw bar function of steering is rendered inoperative.

In disclosing the preferred form of the invention the mechanism to perform the desired operations has been purposely located on the tractor. The reason for this is that the tractor, like a horse, can thus be used with a variety of trailers of ordinary and well-known construction. It is entirely possible, however, to re-locate the parts for the functions described without departing from the invention.

What I claim is:

1. A tractor comprising in combination, a draw bar device adapted for connection with the steering mechanism of a trailer, said device having a flexible joint to permit relative vertical movement and another flexible joint to permit relative horizontal movement between tractor and trailer for hauling operations, and lifting mechanism to connect the tractor with the trailer through the steering means of the latter for the purpose described.

2. A tractor provided with means pivoted thereon and adapted to extend under the steering axle of a trailer, power actuated mechanism to rock and elevate said means at one end into operable engagement with said axle whereby the trailer may be steered in making short turns with the tractor and a hand operable controlling device for said mechanism whereby the trailer may be engaged and released from the said means as desired.

3. A separately operable and steerable tractor constructed for road and field use to turn in narrow spaces, a trailer also constructed for road and field use and provided with steering means to turn in narrow spaces, a draw bar constructed to connect the tractor with the steering means of the trailer, whereby the latter may be hauled and guided by the former, and mechanism on the tractor operable independently of the draw bar when the trailer is stationary or in motion to elevate the front end of the trailer, whereby the weight on the traction wheels is increased or diminished as desired.

4. A tractor for road or field use having front steering and rear traction wheels, a lifting frame pivoted on the rear axle having supporting means extending rearwardly of said axle and adapted to pass under the axle of a trailer, mechanism operable to rock said frame on its pivot, whereby said means may engage to lift and release a trailer axle as desired, and a draw bar to connect the tractor with a trailer independently of the lifting frame.

5. A tractor provided with means adapted to be connected with the steering mechanism of a trailer to haul and guide the latter and independent devices operable by the driver of the tractor when the latter is moving or stationary to lift the front end of the connected trailer by operable engagement with the steering mechanism thereof, whereby the trailer may be guided either through said means or said devices and the steering mechanism of the trailer.

CHARLES H. MARTIN.

Witnesses:
F. G. NEAL,
H. E. HARTWELL.